United States Patent
McCarville et al.

(10) Patent No.: US 10,864,687 B2
(45) Date of Patent: Dec. 15, 2020

(54) RADIUS FILLERS FOR COMPOSITE STRUCTURES, COMPOSITE STRUCTURES THAT INCLUDE RADIUS FILLERS, AND SYSTEMS AND METHODS OF FORMING THE SAME

(71) Applicant: The Boeing Company, Chicago, IL (US)

(72) Inventors: Douglas A. McCarville, Bonney Lake, WA (US); Juan C. Guzman, Seattle, WA (US); Jordan Oliver Birkland, Lynnwood, WA (US); Ryan Shaw Tidwell, Seattle, WA (US); Robert L. Anderson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 142 days.

(21) Appl. No.: 16/021,314

(22) Filed: Jun. 28, 2018

(65) Prior Publication Data

US 2018/0311913 A1 Nov. 1, 2018

Related U.S. Application Data

(62) Division of application No. 14/244,690, filed on Apr. 3, 2014, now Pat. No. 10,035,309.

(51) Int. Cl.
*B29C 70/30* (2006.01)
*B32B 5/02* (2006.01)
(Continued)

(52) U.S. Cl.
CPC .......... *B29C 70/30* (2013.01); *B29D 99/0003* (2013.01); *B32B 5/02* (2013.01);
(Continued)

(58) Field of Classification Search
CPC ......... B29C 70/30; B29C 70/52; B29C 70/14; B29C 70/34; B29D 99/0003;
(Continued)

(56) References Cited

U.S. PATENT DOCUMENTS

| 4,113,910 A | 9/1978 | Loyd |
| 4,331,723 A * | 5/1982 | Hamm ................... B29C 70/865 428/61 |

(Continued)

FOREIGN PATENT DOCUMENTS

| CN | 101959674 | 1/2011 |
| EP | 2610165 | 7/2013 |

(Continued)

OTHER PUBLICATIONS

R. Blanc et al., Fiber Orientation Measurements in Composite Materials, Composites Part A: Applied Science and Manufacturing, Elsevier, 2006, 37 (2), pp. 197-206.

(Continued)

*Primary Examiner* — Brian Handville
(74) *Attorney, Agent, or Firm* — Dascenzo Gates Intellectual Property Law, P.C.

(57) ABSTRACT

Radius fillers for composite structures and composite structures that include radius fillers are disclosed herein. The radius fillers include a plurality of lengths of composite tape. Each of the plurality of lengths of composite tape includes a respective plurality of lengths of reinforcing fibers and a resin material. The plurality of lengths of reinforcing fibers in each of the plurality of lengths of composite tape defines a fiber axis direction. Each of the plurality of lengths of composite tape defines a respective fiber axis direction that is based, at least in part, on material properties of a transition region defined by a plurality of plies of composite material that defines an elongate void space within which the radius (Continued)

filler is configured to extend. The composite structures include the radius fillers.

20 Claims, 6 Drawing Sheets

(51) Int. Cl.
   *B32B 27/00* (2006.01)
   *B29D 99/00* (2010.01)
   *B29K 105/08* (2006.01)
   *B29L 31/30* (2006.01)
   *B29C 70/52* (2006.01)

(52) U.S. Cl.
   CPC .............. *B32B 27/00* (2013.01); *B29C 70/52* (2013.01); *B29K 2105/0872* (2013.01); *B29L 2031/3082* (2013.01); *B29L 2031/3085* (2013.01); *B32B 2605/18* (2013.01); *Y10T 428/24521* (2015.01); *Y10T 428/24612* (2015.01)

(58) Field of Classification Search
   CPC ....... B29D 99/0021; B32B 5/02; B32B 27/00; B32B 2605/18; B32B 27/02; B32B 5/28; Y10T 428/24521; Y10T 428/24612; B29K 2105/0872; B29K 2105/06; B29L 2031/3082; B29L 2031/3085; B64F 5/10; B60Y 2200/51; B29B 11/16; B64C 1/00
   See application file for complete search history.

(56) References Cited

U.S. PATENT DOCUMENTS

| | | | |
|---|---|---|---|
| 4,440,593 A | 4/1984 | Goldsworthy | |
| 4,559,005 A | 12/1985 | Gants et al. | |
| 4,789,594 A | 12/1988 | Stawski | |
| 4,919,739 A | 4/1990 | Dyksterhouse et al. | |
| 5,026,447 A | 6/1991 | O'Connor | |
| 5,192,383 A | 3/1993 | Cavin | |
| 5,268,050 A | 12/1993 | Azari | |
| 5,556,496 A | 9/1996 | Sumerak | |
| 5,639,535 A | 6/1997 | McCarville | |
| 5,948,472 A | 9/1999 | Lawrie | |
| 6,500,370 B1 | 12/2002 | Belvin et al. | |
| 6,562,436 B2 * | 5/2003 | George | B32B 5/12 428/105 |
| 6,689,448 B2 | 2/2004 | George et al. | |
| 6,709,538 B2 | 3/2004 | George et al. | |
| 6,800,164 B2 | 10/2004 | Brandstrom | |
| 7,534,319 B2 | 5/2009 | Mead et al. | |
| 7,987,885 B2 | 8/2011 | Zhou et al. | |
| 8,101,107 B2 | 1/2012 | Brown et al. | |
| 8,211,530 B2 | 7/2012 | Mead et al. | |
| 8,591,685 B2 | 11/2013 | Anderson et al. | |
| 8,815,036 B2 | 8/2014 | Nitsch | |
| 9,643,395 B2 | 5/2017 | Kline et al. | |
| 2005/0048273 A1 | 3/2005 | Ryan | |
| 2007/0116941 A1 | 5/2007 | Brown et al. | |
| 2007/0175573 A1 | 8/2007 | Fox et al. | |
| 2008/0053599 A1 | 3/2008 | Aijima | |
| 2012/0237736 A1 | 9/2012 | Blot et al. | |
| 2013/0105072 A1 | 5/2013 | Anderson et al. | |
| 2013/0149521 A1 | 6/2013 | Nelson et al. | |
| 2014/0034236 A1 | 2/2014 | Guzman et al. | |
| 2015/0283764 A1 | 10/2015 | McCarville et al. | |

FOREIGN PATENT DOCUMENTS

| | | |
|---|---|---|
| JP | S 48-23154 | 7/1973 |
| JP | H 01-208147 | 8/1989 |
| JP | H 04-299110 | 10/1992 |
| JP | 2013-530855 | 8/2013 |
| RU | 2415750 | 4/2011 |
| WO | WO 0162495 | 8/2001 |
| WO | WO 2011/001080 | 1/2011 |

OTHER PUBLICATIONS

Machine generated English translation of abstract for WO 2011/001080 downloaded from Espacenet.com on Apr. 22, 2016.
Machine generated English translation of abstract for CN 10195974 downloaded from Espacenet.com on Apr. 22, 2016.
Machine generated English language translation of abstract for RU 2415750, downloaded from Espacenet.com on May 31, 2017.
English language translation of abstract for JPH 04-299110.
Machine generated English language translation of abstract for JPS 48-23154, downloaded from Espacenet.com on Jun. 22, 2017.
Machine generated English language translation of abstract for JPH 01-208147, downloaded from Espacenet.com on Jun. 22, 2017.
Machine generated English language translation of abstract for JP 2013-530855, downloaded from Espacenet.com on Jun. 22, 2017.

* cited by examiner

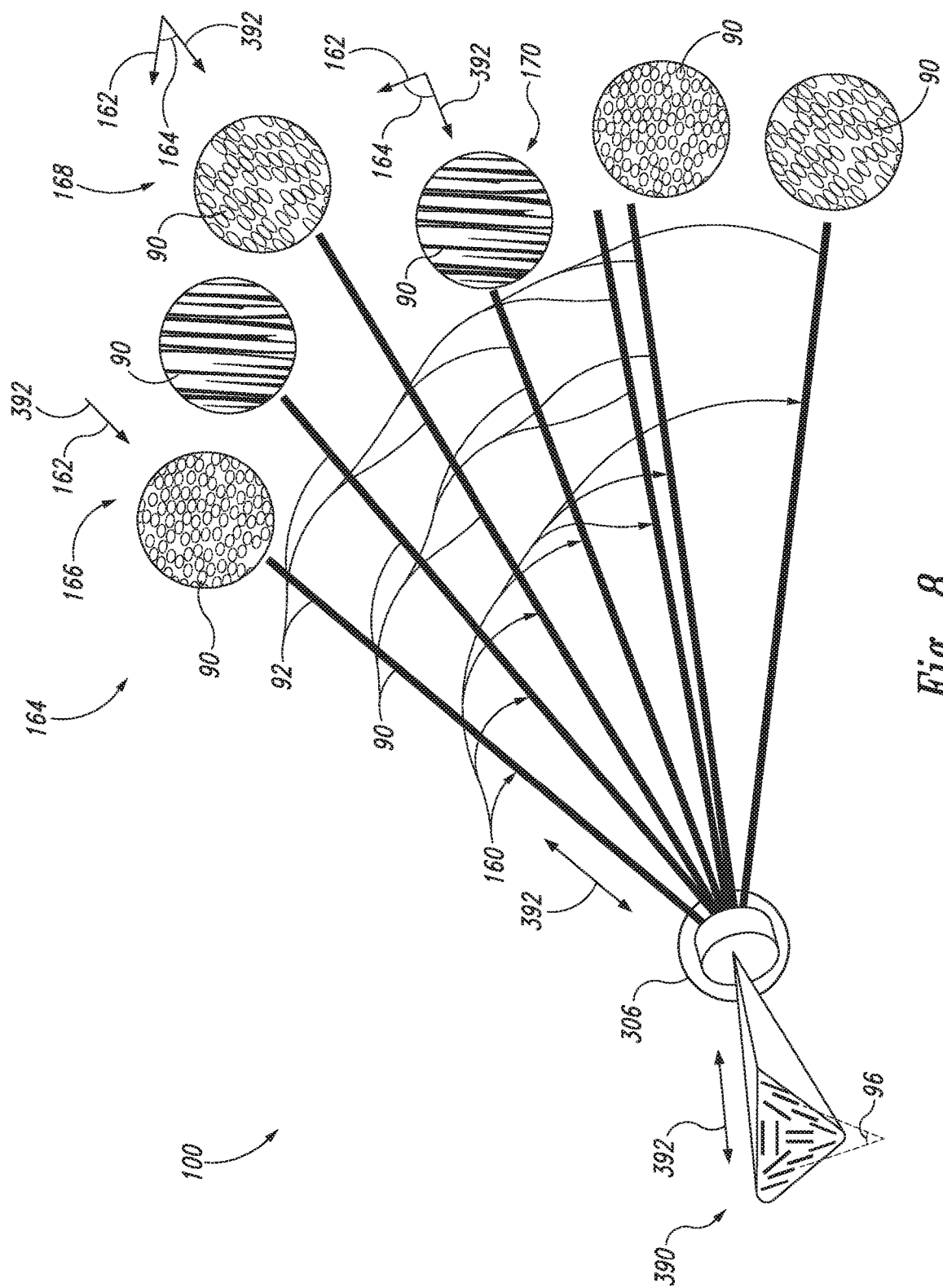

RADIUS FILLERS FOR COMPOSITE STRUCTURES, COMPOSITE STRUCTURES THAT INCLUDE RADIUS FILLERS, AND SYSTEMS AND METHODS OF FORMING THE SAME

RELATED APPLICATION

The present application is a divisional of and claims priority to U.S. patent application Ser. No. 14/244,690, filed on Apr. 3, 2014 and entitled "RADIUS FILLERS FOR COMPOSITE STRUCTURES, COMPOSITE STRUCTURES THAT INCLUDE RADIUS FILLERS, AND SYSTEMS AND METHODS OF FORMING THE SAME," the complete disclosure of which is incorporated herein by reference.

FIELD

The present disclosure relates generally to radius fillers that may be utilized to fill void spaces within composite structures and more particularly to radius fillers with material properties that correspond to material properties of the surrounding composite structure and/or to systems and methods of forming the same.

BACKGROUND

Composite structures often include a laminate structure in which sheets of a composite material, such as a pre-impregnated (or prepreg) material, may be bent, wrapped, and/or otherwise extended between a first plane, or surface, and a second plane, or surface. The finite thickness and/or mechanical stiffness of the sheets of composite material result in a finite bend, or radius of curvature, in a transition region between the first surface and the second surface; and, in some geometries, this finite radius of curvature results in a void space, or cavity, between adjacent sheets of composite material.

This void space may be filled with, or otherwise occupied by, a filler material, such as a radius filler. The radius filler may be configured to provide mechanical support to the sheets of composite material that are proximal thereto and/or to decrease a potential for distortion of the sheets of composite material while the composite structure is curing. While the presence of the radius filler may provide a variety of benefits to the composite structure, differences between a geometry, cross-sectional shape, and/or material property of the radius filler when compared to a geometry, cross-sectional shape, and/or material property of the composite material that defines the void space may distort the composite structure and/or the radius filler during formation and/or curing of the composite structure. Thus, it may be desirable to closely match the shape of the radius filler to a shape, or a desired shape, of the void space. In addition, it also may be desirable to match the material properties of the radius filler to that of the sheets of composite material and/or the resultant composite structure.

Traditional radius fillers often utilize a single length of composite material that may be creased in a number of locations to form an accordion shape and then molded to a final desired shape. Alternatively, the traditional radius fillers may utilize a plurality of lengths of composite material that are stacked, one on top of the other, to form a plurality of parallel planes of composite material. Neither of these approaches permits tight control of the shape and/or material properties of the radius filler, let alone matching the shape and/or material properties to that of the surrounding layup. Thus, there exists a need for improved radius fillers for composite structures, as well as for improved systems and methods for fabricating the radius fillers.

SUMMARY

Radius fillers for composite structures, composite structures that include radius fillers, and systems and methods of forming the same are disclosed herein. The methods include determining a transverse cross-sectional shape of an elongate void space, which extends within a transition region that is defined by a plurality of plies of composite material, and determining a material property field of the transition region. The methods further include forming the radius filler by combining a plurality of lengths of composite tape to define a radius filler cross-sectional shape, which corresponds to the transverse cross-sectional shape of the elongate void space, and orienting a plurality of lengths of reinforcing fiber in each of the plurality of lengths of composite tape based, at least in part, on the material property field of the transition region.

In some embodiments, the determining the transverse cross-sectional shape of the elongate void space includes modeling the composite structure and/or determining a desired transverse cross-sectional shape of for the elongate void space. In some embodiments, the determining the material property field of the transition region includes modeling at least a portion of the composite structure.

In some embodiments, the orienting includes orienting such that a material property field of the radius filler corresponds to the material property field of the transition region. In some embodiments, the orienting includes orienting such that the material property field of the radius filler matches the material property field of the transition region to within a threshold material property field difference.

In some embodiments, the determining the material property field of the transition region includes determining a two-dimensional and/or a three-dimensional material property field of the transition region. In some embodiments, the material property field of the transition region includes a stiffness field of the transition region, a coefficient of thermal expansion field of the transition region, and/or a stress field of the transition region.

In some embodiments, the determining the material property field of the transition region includes determining a principle stress region within the transition region and/or determining a principle stress direction within the principle stress region. In some embodiments, the orienting includes orienting such that at least one of the plurality of lengths of composite tape defines a respective fiber axis direction that extends within a portion of the radius filler that is located within the principle stress region and/or that extends at least substantially parallel to the principle stress direction.

In some embodiments, the methods further include determining the fiber axis direction within each of the plurality of lengths of composite tape based, at least in part, on the transverse cross-sectional shape of the elongate void space and/or on the material property field of the transition region. In some embodiments, the methods further include establishing a relative location of each of the plurality of lengths of composite tape within the radius filler based, at least in part, on the transverse cross-sectional shape of the elongate void space and/or on the material property field of the transition region.

In some embodiments, the combining includes combining such that a fiber axis direction of each length of composite tape that defines an outer surface of the radius filler is oriented in a direction that is parallel to a longitudinal axis of the radius filler. In some embodiments, the combining includes receiving the plurality of lengths of composite tape into a plurality of first openings of a forming die, pressing the plurality of lengths of composite tape together within the forming die to form the radius filler, and withdrawing the radius filler from a second opening of the forming die. In some embodiments, the methods further include locating the radius filler within the composite structure.

The radius fillers include radius fillers with selectively oriented reinforcing fibers. The radius fillers include a plurality of lengths of composite tape and each of the plurality of lengths of composite tape includes a respective plurality of lengths of reinforcing fibers. The plurality of lengths of reinforcing fibers in each of the plurality of lengths of composite tape defines a respective fiber axis direction that is selected based upon the material property field of the transition region.

In some embodiments, the material property field of the radius filler corresponds to the material property field of the transition region. In some embodiments, the material property field of the radius filler matches the material property field of the transition region to within a threshold material property field difference.

The composite structures include a plurality of plies of composite material, which converge within a transition region to define an elongate void space, and the radius fillers. In some embodiments, the composite structures include an aircraft and/or a portion of an aircraft.

BRIEF DESCRIPTION OF THE DRAWINGS

FIG. 8 is a schematic representation of a system for forming a radius filler according to the preset disclosure and/or of fiber axis directions for lengths of composite tape that may be combined in a forming die to produce a radius filler according to the present disclosure.

DESCRIPTION

Figure 1:
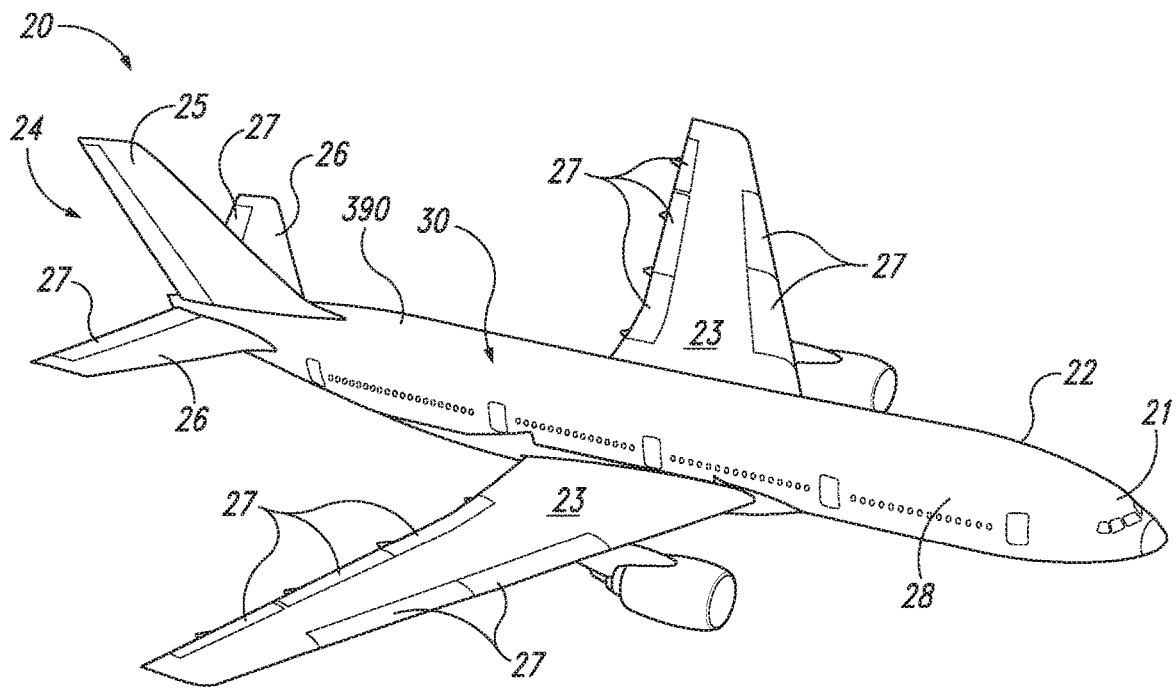
FIG. 1 is a schematic representation of an illustrative, non-exclusive example of an aircraft that may include one or more composite structures that may utilize radius fillers according to the present disclosure.

FIGS. 1-12 provide examples of radius fillers 390, of composite structures 30 that include radius fillers 390, and/or of systems 100 and methods 400 of manufacturing the radius fillers. Elements that serve a similar, or at least substantially similar, purpose are labeled with like numbers in each of FIGS. 1-12, and these elements may not be discussed in detail herein with reference to each of FIGS. 1-12. Similarly, all elements may not be labeled in each of FIGS. 1-12, but reference numerals associated therewith may be utilized herein for consistency. Elements, components, and/or features that are discussed herein with reference to one or more of FIGS. 1-12 may be included in and/or utilized with any of FIGS. 1-12 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic representation of an illustrative, non-exclusive example of an aircraft 20 that may include one or more composite structures 30. Composite structures 30 may include and/or utilize radius fillers 390 according to the present disclosure. Composite structures 30 may form any suitable portion of aircraft 20. As illustrative, non-exclusive examples composite structures 30 may form any suitable portion of a cockpit 21, a fuselage 22, wings 23, a tail 24, a vertical stabilizer 25, horizontal stabilizers 26, control surfaces 27, and/or an interior 28 of aircraft 20.

Figure 2:
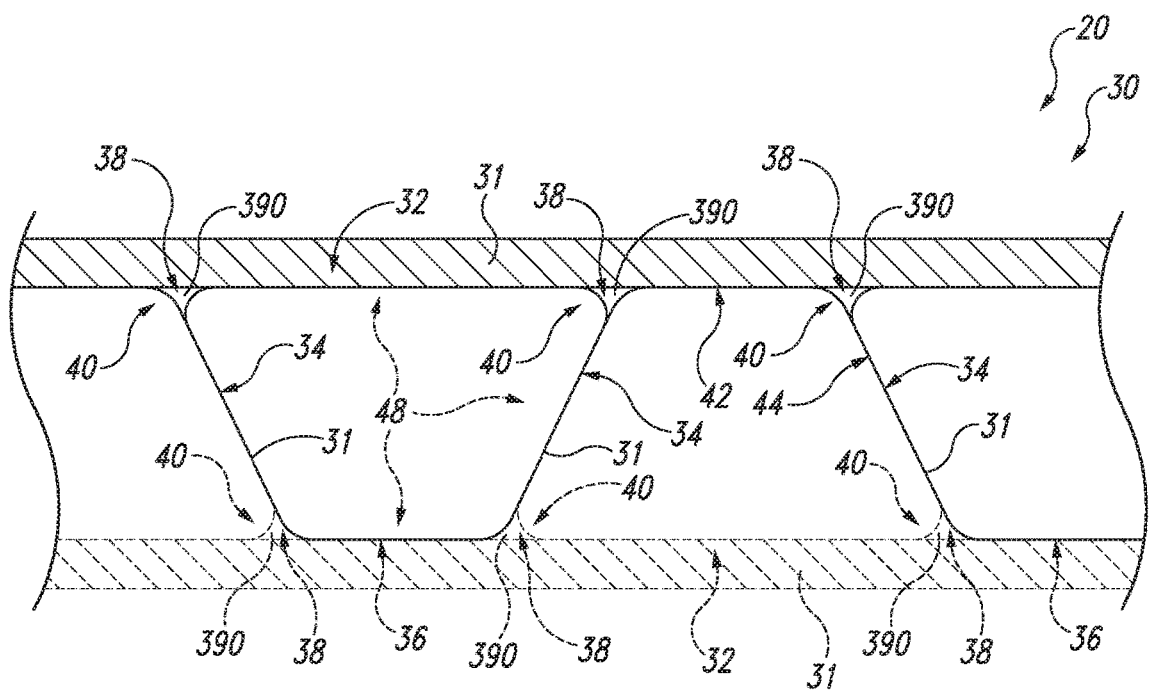
FIG. 2 is a schematic representation of illustrative, non-exclusive examples of a composite structure according to the present disclosure.

Similarly, composite structures 30 may include any suitable form, an illustrative, non-exclusive example of which is shown in FIG. 2. The composite structure of FIG. 2 includes a skin 32 and a plurality of webs 34, each of which may be formed from one or more sheets, plies, and/or layups 48 of composite material 31. Composite structures 30 may include a single skin 32, with a plurality of hat stiffeners 36 that are formed from webs 34. Alternatively, and as illustrated in dashed lines in FIG. 2, composite structures 30 also may include two skins 32, with webs 34 extending therebetween.

Regardless of the specific construction of composite structures 30, skins 32 and/or webs 34 may define voids 38, which also may be referred to herein as elongate voids 38, as void spaces 38, and/or as elongate void spaces 38. Voids 38 may be defined within a transition region 40 between skins 32 and webs 34 and/or in any suitable transition region 40 between a first plane, or surface, 42 and a second plane, or surface, 44 of composite structure 30. Voids 38 may be filled with, or otherwise occupied by, a radius filler 390, which may extend therein; and a shape and/or one or more material properties of radius filler 390 may impact a shape and/or one or more material properties of composite structures 30.

Figure 3:
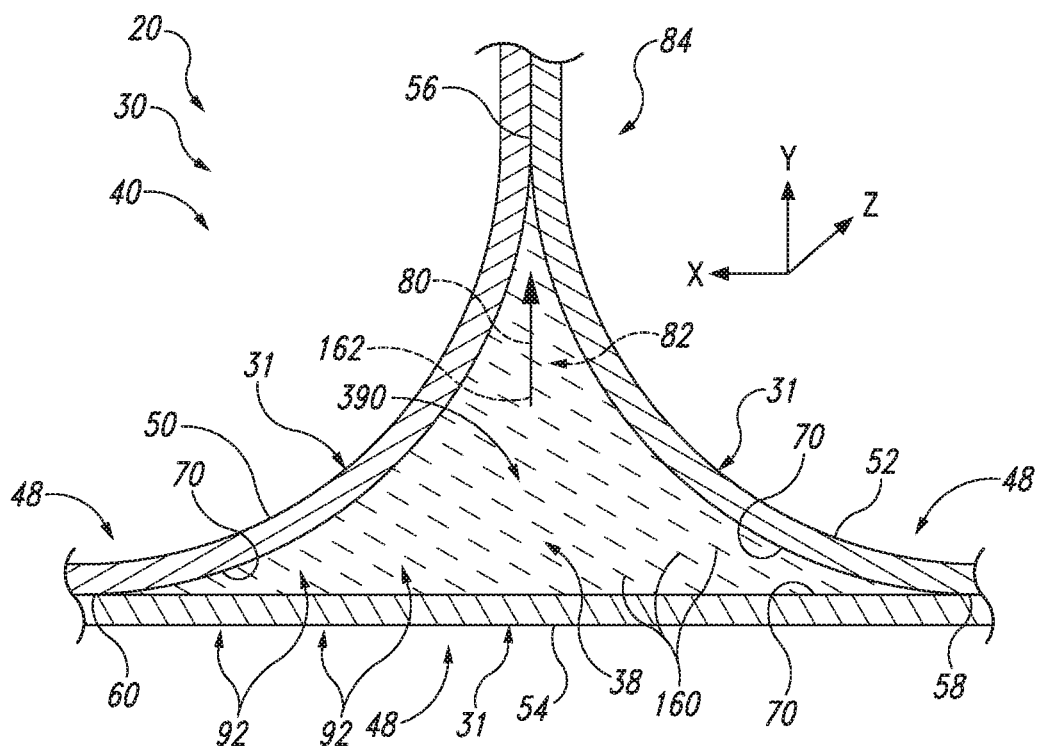
FIG. 3 is a schematic cross-sectional view of a transition region of a composite structure that may include and/or utilize a radius filler according to the present disclosure.

FIG. 3 is a schematic cross-sectional view of a transition region 40 of a composite structure 30 that may include and/or utilize radius fillers 390 according to the present disclosure. As illustrated in FIG. 3, transition region 40 may be defined by a first ply 50 of composite material 31, a second ply 52 of composite material 31, and a third ply 54 of composite material 31. However, other transition regions 40 are also within the scope of the present disclosure, including transition regions 40 that are defined by fewer than three plies of composite material 31, by more than three plies of composite material 31, and/or by a plurality of stacked and/or layered plies of composite material 31.

In the illustrative, non-exclusive example of FIG. 3, first ply 50 and second ply 52 converge within transition region 40 to define a first contact region 56 therebetween. Similarly, second ply 52 and third ply 54 converge within transition region 40 to define a second contact region 58 therebetween. In addition, third ply 54 and first ply 50 converge within transition region 40 to define a third contact region 60 therebetween. As illustrated, first contact region 56, second contact region 58, and third contact region 60 terminate within and/or into a void space 38 that is defined within transition region 40. As illustrated in dashed lines, a radius filler 390 may extend within void space 38, may substantially and/or completely fill void space 38, may be in contact with first ply 50, second ply 52, and/or third ply 54, may be adhered and/or operatively affixed to first ply 50, second ply 52, and/or third ply 54, and/or may form an interface 70 with first ply 50, second ply 52, and/or third ply 54. Void space 38 and/or radius filler 390 may have and/or define any suitable transverse cross-sectional shape, illustrative, non-exclusive examples of which include a triangular transverse cross-sectional shape, a wedge-shaped transverse cross-sectional shape, and/or a transverse cross-sectional shape that defines a base and a plurality of convergingly angled sides.

First ply 50, second ply 52, and third ply 54 generally may be referred to herein as plies 48 of composite material 31 and may have, or define, one or more material properties of transition region 40. These material properties may be governed by and/or based upon an overall shape and/or geometry of composite structure 30 and/or of transition region 40 and/or a material of construction of composite structure 30 and/or of plies 48 that define transition region 40. Plies 48 may be formed from a composite material 31 that includes a plurality of reinforcing fibers 90 that are coated, encapsulated, and/or covered by a resin material 92. Under these conditions, the material properties of transition region 40 also may be governed by and/or based upon a relative proportion of reinforcing fibers 90 to resin material 92 within plies 48, a composition of reinforcing fibers 90, a composition of resin material 92, a material property of reinforcing fibers 90, a material property of resin material 92, and/or a relative orientation of reinforcing fibers 90 within plies 48.

Generally, the material properties of composite structure 30 and/or of transition region 40 thereof may not be uniform, may not be isotropic, may be anisotropic, and/or may vary with location and/or direction within composite structure 30 and/or within transition region 40 thereof. As an illustrative, non-exclusive example, the material properties of transition region 40 may be different in the X-direction, the Y-direction, and the Z-direction due to the various characteristics of plies 48 that are discussed above.

This variation in material properties with direction within transition region 40 may be described, quantified, and/or represented by a material property field for transition region 40 and may be determined and/or measured in any suitable manner. As an illustrative, non-exclusive example, transition region 40 may be formed and/or constructed and the material properties thereof may be measured to determine the material property field of transition region 40. As another illustrative, non-exclusive example, transition region 40 may be modelled, such as via any suitable mathematical modeling and/or finite element analysis, to establish, estimate, and/or determine the material property field of transition region 40.

As discussed in more detail herein, radius filler 390 includes, may be formed from, and/or may be formed exclusively from a plurality of lengths of composite tape 160. The plurality of lengths of composite tape 160 may be in face-to-face contact with one another, in direct face-to-face contact with one another, in intimate contact with one another, and/or pressed against one another within radius filler 390. Each of the plurality of lengths of composite tape 160 may include a plurality of lengths of reinforcing fibers 90 and a resin material 92. As discussed in more detail herein, the plurality of lengths of reinforcing fibers 90 within a given length of composite tape 160 generally are oriented in a fiber orientation direction, which also may be referred to herein as a fiber axis direction and/or as a fiber axis. In radius fillers 390 according to the present disclosure, the relative orientation of the various lengths of composite tape and/or the fiber axis direction of a given length of composite tape may be selected based upon the material property field of transition region 40.

The plurality of lengths of composite tape 160 may include any suitable number of lengths of composite tape 160. As illustrative, non-exclusive examples, the plurality of lengths of composite tape 160 may include at least 2, at least 4, at least 6, at least 8, at least 10, at least 15, at least 20, at least 30, at least 40, at least 50, at least 60, or at least 80 lengths of composite tape 160. It is within the scope of the present disclosure that the number of lengths of composite tape 160 may vary along the length of radius filler 390, such as to account for variations in the cross-sectional area of void space 38.

The plurality of lengths of composite tape 160 within radius filler 390 may be oriented such that lengths of composite tape 160 are not coplanar with one another. Additionally or alternatively, the plurality of lengths of composite tape 160 also may be oriented such that at least one of the plurality of lengths of composite tape is in direct physical contact with another length of composite tape but not coplanar with the other length of composite tape.

As a more specific but still illustrative, non-exclusive example, a first length of composite tape 160 may be oriented at a skew angle with respect to a second length (or a remainder of the lengths) of composite tape 160. Additionally or alternatively, a third length of composite tape may be oriented at a skew angle with respect to the first and the second lengths of composite tape. Illustrative, non-exclusive examples of the skew angle include skew angles of at least 5 degrees, at least 10 degrees, at least 15 degrees, at least 20 degrees, at least 25 degrees, at least 30 degrees, at least 35 degrees, at least 40 degrees, or at least 45 degrees. Additionally or alternatively, the skew angle also may be less than 90 degrees, less than 85 degrees, less than 80 degrees, less than 75 degrees, less than 70 degrees, less than 65 degrees, less than 60 degrees, less than 55 degrees, less than 50 degrees, or less than 40 degrees. The skew angle may be measured in a transverse cross-section of radius filler 390 (i.e., in the X-Y plane).

It is within the scope of the present disclosure that radius filler 390 may be formed solely and/or exclusively of lengths of composite tape 160. As illustrative, non-exclusive examples, radius filler 390 may not include a separate resin material and/or thermoplastic resin material that extends between and/or separates the plurality of lengths of composite tape from one another.

As discussed in more detail herein, the various lengths of composite tape 160 may be oriented relative to one another such that a material property field of radius filler 390 corresponds to the material property field of transition region 40. This may include orienting the various lengths of composite tape such that they define skew angles that cause the material property field of radius filler 390 to correspond to the material property field of transition region 40 and/or selecting the various lengths of composite tape such that they define respective fiber axis directions that cause the material property field of radius filler 390 to correspond to the material property field of transition region 40.

It is within the scope of the present disclosure that the material property field of radius filler 390 may correspond to the material property field of transition region 40 in any suitable manner. As an illustrative, non-exclusive example, the material property field of radius filler 390 may match the material property field of transition region 40 to within a threshold material property field difference at interface 70 between transition region 40 (or plies 48 thereof) and radius filler 390. As illustrative, non-exclusive examples, the threshold material property field difference may be less than 50%, less than 40%, less than 30%, less than 20%, less than 15%, less than 10%, less than 5%, less than 2.5%, or less than 1% of the material property field of the transition region at interface 70.

As used herein, the phrases, "material property field of transition region 40," "material property field of the transition region," "material property field of radius filler 390," and/or "material property field of the radius filler" may refer to any suitable mathematical description of the magnitude, orientation, and/or variation in one or more material properties with location and/or direction within transition region 40 and/or radius filler 390, respectively. It is within the scope of the present disclosure that the material property fields (of transition region 40 and/or of radius filler 390) may be one-dimensional material property fields that describe the one or more material properties (of transition region 40 and/or of radius filler 390) in a single direction (such as the X-direction, the Y-direction, or the Z-direction, though this is not required). Additionally or alternatively, the material property fields may be multi-dimensional material property fields that describe the one or more material properties in two directions, in three directions, or in more than three directions. As an illustrative, non-exclusive example, the material property fields may have a first field value in a first direction that extends along void space 38 (i.e., the Z-direction), a second field value in a second direction that is perpendicular to the first direction (i.e., one of the X-direction and the Y-direction), and a third field value in a third direction that is perpendicular to the first direction and the second direction (i.e., the other of the X-direction and the Y-direction). The material property fields also may describe the one or more material properties at a plurality of discrete locations within transition region 40 and/or radius filler 390.

It is within the scope of the present disclosure that the material property field of radius filler 390 may correspond to the material property field of transition region 40 in any suitable direction and/or directions, including the first direction, the second direction, the third direction, within a plane that is defined by the first direction and the second direction, within a plane that is defined by the second direction and the third direction, and/or in a plane that is defined by the first direction and the third direction. Additionally or alternatively, the material property field of radius filler 390 may correspond to the material property field of transition region 40 within interface 70 and/or at a plurality of discrete locations within interface region 70.

The material property fields also may be referred to herein as material property tensors, scalar material property fields, vector material property fields, material property distributions, and/or material property gradients.

It is within the scope of the present disclosure that any suitable material property field of transition region 40 may be determined. The determined material property field of transition region 40 then may be utilized to establish, estimate, quantify, and/or determine one or more forces that may be applied to radius filler 390 by transition region 40, to establish and/or select the fiber axis direction within a given length of composite tape 160 of radius filler 390 (such as by selecting the skew angle among the plurality of lengths of composite tape), to establish and/or select the relative orientation among the plurality of lengths of composite tape 160 of radius filler 390, and/or to establish and/or select a desired material property field of radius filler 390. Illustrative, non-exclusive examples of material property fields of transition region 40 include a stiffness field of transition region 40, a coefficient of thermal expansion field of transition region 40, a stress field of transition region 40, a strain field of transition region 40, and/or a resin shrinkage field of transition region 40. Illustrative, non-exclusive examples of material property fields of radius filler 390 include a stiffness field of radius filler 390, a coefficient of thermal expansion field of radius filler 390, a stress field of radius filler 390, a strain field of radius filler 390, and/or a resin shrinkage field of radius filler 390.

The stiffness field of transition region 40 may describe any suitable stiffness of transition region 40 at any suitable location and/or locations, in any suitable direction, and/or in any suitable combination of directions. The stiffness may be quantified by any suitable parameter, illustrative, non-exclusive examples of which include an elastic modulus of the transition region, a Young's modulus of the transition region, and/or a rigidity modulus of the transition region. Similarly, the stiffness field of radius filler 390 may describe any suitable stiffness of radius filler 390 at any suitable location and/or locations, in any suitable direction, and/or in any suitable combination of directions.

The coefficient of thermal expansion field of transition region 40 may describe thermally induced expansion and/or contraction of plies 48 within transition region 40 at any suitable location and/or locations, in any suitable direction, and/or in any suitable combination of directions. As an illustrative, non-exclusive example, plies 48 may expand and/or contract significantly during formation and/or curing of composite structure 30, and the coefficient of thermal expansion field of the transition region may describe this expansion and/or contraction. Similarly, the coefficient of thermal expansion field of radius filler 390 may describe any suitable thermally induced expansion and/or contraction of lengths of composite tape 160 within radius filler 390 at any suitable location and/or locations, in any suitable direction, and/or in any suitable combination of directions.

The stress field of transition region 40 may describe a stress state, or residual stress, of plies 48 within transition region 40 at a given point in time and/or at any suitable location and/or locations, in any suitable direction, and/or in any suitable combination of directions. Such a stress state may produce and/or generate motion (i.e., strain) and/or relaxation of plies 48 within transition region 40, thereby changing a shape of void space 38 and/or applying one or more forces to radius filler 390. As an illustrative, non-exclusive example, and subsequent to formation but prior to curing of composite structure 30, plies 48 may contain residual stresses, and these residual stresses may relax during curing of composite structure 30. This relaxation may produce motion of plies 48, thereby changing the shape of void space 38 and/or applying the one or more forces to radius filler 390. Similarly, the stress field of radius filler 390 may describe a stress state, or residual stress, of lengths of composite tape 160 within radius filler 390 at a given point in time and/or at any suitable location and/or locations, in any suitable direction, and/or in any suitable combination of directions.

When the material field of transition region 40 includes the stress field of transition region 40, the stress field of transition region 40 may define a principle, main, high, and/or highest stress region 80 that may be stressed in a principle, main, high, and/or highest stress direction 82. Under these conditions, at least one length of composite tape of the plurality of lengths of composite tape may be oriented such that a respective fiber axis direction 162 of the plurality of reinforcing fibers 90 thereof is located and/or extends within principle stress region 80 and is, or extends, at least substantially parallel to principle stress direction 82. Additionally or alternatively, the plurality of lengths of composite tape may be oriented such that a plane that passes through radius filler 390 and is perpendicular to principle stress direction 82 intersects the plurality of lengths of reinforcing fiber of at least one of the lengths of composite tape. This may increase resistance to cracking and/or separation of radius filler 390 within composite structure 30. Additionally or alternatively, radius filler 390 may define an apex region 84 within a plane that is perpendicular to a longitudinal axis of the void space 38 (i.e., perpendicular to the Z-axis and/or in the X-Y plane), and at least one length of composite tape of the plurality of lengths of composite tape may define a respective fiber axis direction that is directed into apex region 84.

The principle stress direction may be measured and/or defined with any suitable orientation within transition region 40. As an illustrative, non-exclusive example, the principle stress direction may be measured and/or defined perpendicular to the longitudinal axis of the void space 38 (i.e., perpendicular to the Z-axis and/or in the X-Y plane).

The strain field of the transition region 40 may describe a strain state of plies 48 within transition region 40 at a given point in time and/or at any suitable location and/or locations, in any suitable direction, and/or in any suitable combination of directions. Such a strain state may change and/or relax with time, once again changing the shape of void space 38 and applying one or more forces to radius filler 390. As an illustrative, non-exclusive example, curing of composite structure 30 may cause changes in the strain state. As another illustrative, non-exclusive example, and during operation and/or use of composite structure 30, the strain field may change and/or fluctuate, thereby changing the shape of void space 38 and/or applying one or more forces to radius filler 390. Similarly, the strain field of radius filler 390 may describe a strain state of lengths of composite tape 160 within radius filler 390 at the given point in time and/or at any suitable location and/or locations, in any suitable direction, and/or in any suitable combination of directions.

The resin shrinkage field of transition region 40 may describe changes in resin volume and/or location within transition region 40 at any suitable point in time, such as during curing of composite structure 30. These changes in resin volume and/or location may, once again, produce changes in the shape of void space 38. Additionally or alternatively, these changes in resin volume and/or location also may generate changes in the stiffness of transition region 40. Similarly, the resin shrinkage field of radius filler 390 may describe changes in resin volume and/or location within radius filler 390 at the given point in time.

Figure 4:
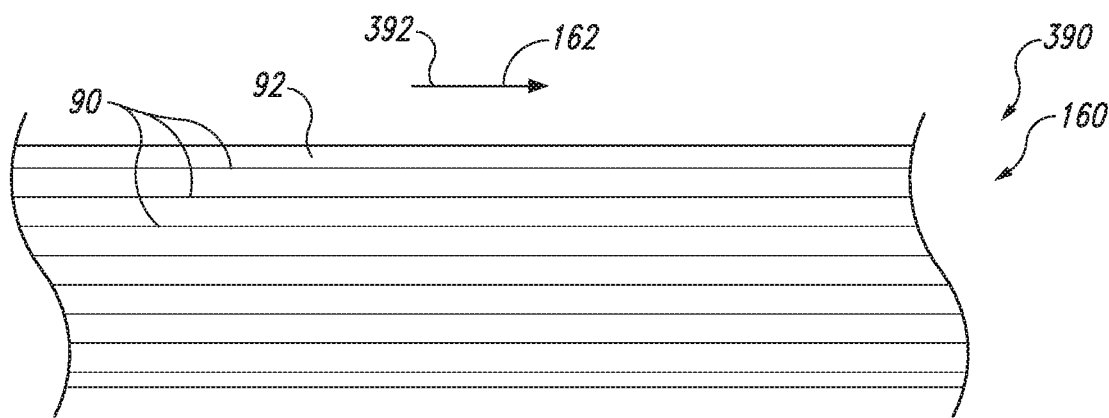
FIG. 4 is a schematic top view of a length of composite tape that may be utilized with the systems and methods according to the present disclosure.
Figure 5:
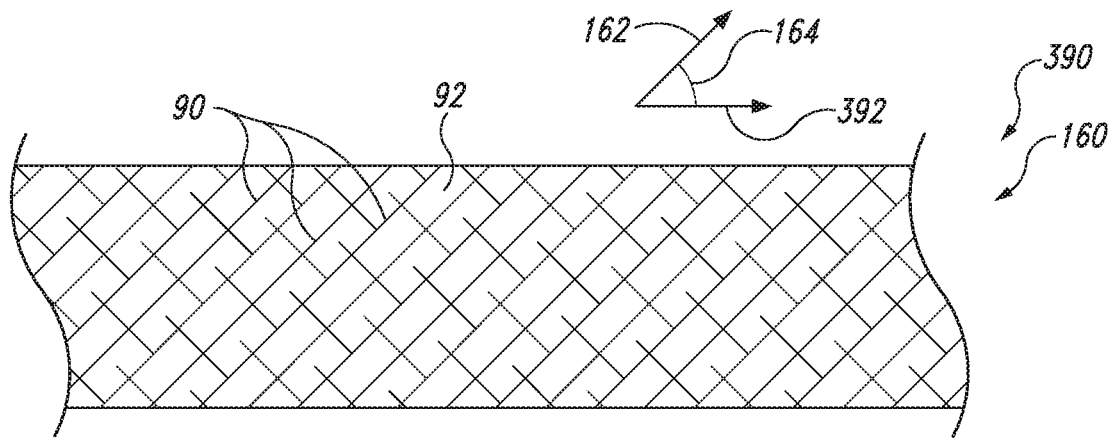
FIG. 5 is another schematic top view of a length of composite tape that may be utilized with the systems and methods according to the present disclosure.
Figure 6:
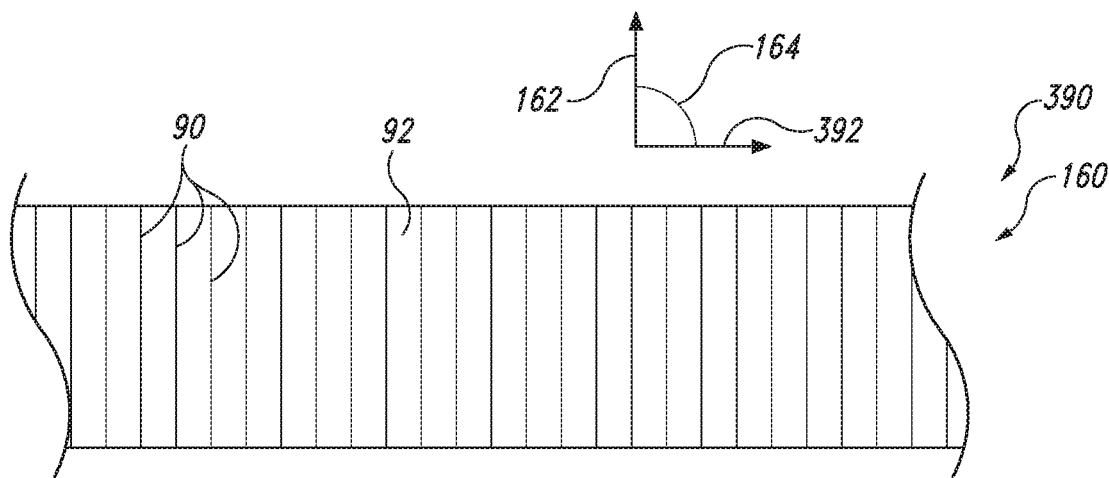
FIG. 6 is another schematic top view of a length of composite tape that may be utilized with the systems and methods according to the present disclosure.

FIGS. 4-6 are schematic top views of lengths of composite tape 160 that may be utilized with the systems and methods according to the present disclosure. As discussed, each length of composite tape 160 may include a plurality of reinforcing fibers 90 and a resin material 92. Resin material 92 may cover, surround, and/or encapsulate reinforcing fibers 90. Illustrative, non-exclusive examples of reinforcing fibers 90 include any suitable carbon fiber, titanium fiber, aluminum fiber, glass fiber, and/or metal fiber. Illustrative, non-exclusive examples of resin material 92 include any suitable epoxy and/or polymeric material.

Lengths of composite tape 160 may have and/or define any suitable length and/or width within radius fillers 390 according to the present disclosure. As illustrative, non-exclusive examples, at least a portion of the plurality of lengths of composite tape 160 may have a length of at least 1 meter (m), at least 2 m, at least 3 m, at least 4 m, at least 5 m, at least 6 m, at least 7 m, at least 8 m, at least 9 m, at least 10 m, at least 15 m, and/or at least 20 m. Additionally or alternatively, the length also may be less than 50 m, less than 40 m, less than 30 m, less than 25 m, less than 20 m, less than 15 m, less than 10 m, and/or less than 5 m.

As additional illustrative, non-exclusive examples, at least a portion of the plurality of lengths of composite tape 160 may have a width of at least 3 millimeters (mm), at least 4 mm, at least 5 mm, at least 6 mm, at least 7 mm, at least 8 mm, at least 9 mm, at least 10 mm, at least 11 mm, at least 12 mm, at least 14 mm, at least 16 mm, at least 18 mm, at least 20 mm, and/or at least 24 mm. Additionally or alternatively, the width also may be less than 50 mm, less than 45 mm, less than 40 mm, less than 35 mm, less than 30 mm, less than 25 mm, less than 20 mm, less than 18 mm, less than 16 mm, less than 14 mm, less than 12 mm, less than 10 mm, less than 8 mm, less than 6 mm, and/or less than 4 mm.

The portion of the plurality of lengths of composite tape may include and/or be any suitable portion, percentage, and/or fraction of the plurality of lengths of composite tape. As illustrative, non-exclusive examples, the portion of the plurality of lengths of composite tape may include at least one length of composite tape, two lengths of composite tape, three lengths of composite tape, at least 25% of the plurality of lengths of composite tape, at least 50% of the plurality of composite tape, at least 75% of the plurality of lengths of composite tape, and/or 100% of the plurality of lengths of composite tape.

As illustrated in FIGS. 4-6, reinforcing fibers 90 (or a longitudinal axis of fibers 90) of a given length of composite tape 160 may be oriented, or oriented generally, along and/or parallel to a fiber axis direction 162. The given length of composite tape 160 also may define a longitudinal axis 392, which may be at least substantially parallel to and/or may be referred to herein as a radius filler longitudinal axis 392 of radius filler 390 when lengths of composite tape 160 are located within radius filler 390. It is within the scope of the present disclosure that fiber axis direction 162 may be parallel to longitudinal axis 392 (as illustrated in FIG. 4) and/or oriented at a fiber angle 164 with respect to longitudinal axis 392 (as illustrated in FIGS. 5-6). As discussed, the fiber angle may be selected based, at least in part, on the material property field of transition region 40.

Illustrative, non-exclusive examples of fiber angle 164 include fiber angles of at least 5 degrees, at least 10 degrees, at least 15 degrees, at least 20 degrees, at least 25 degrees, at least 30 degrees, at least 35 degrees, at least 40 degrees, and/or at least 45 degrees. Additionally or alternatively, fiber angle 164 also may be less than 85 degrees, less than 80 degrees, less than 75 degrees, less than 70 degrees, less than 65 degrees, less than 60 degrees, less than 55 degrees, less than 50 degrees, and/or less than 40 degrees.

As illustrated in dashed lines in FIG. 5, reinforcing fibers 90 also may be oriented to form a two-dimensional arrangement within a given length of composite tape 160. Illustrative, non-exclusive examples of the 2-dimensioal arrangement include a mesh, a woven structure, a cloth, and/or a random array of reinforcing fibers 90. It is also within the scope of the present disclosure that reinforcing fibers 90 may form a three-dimensional arrangement within a given length of composite tape 160. Illustrative, non-exclusive examples of the three-dimensional arrangement include a mesh, a woven structure, a cloth, a random array of reinforcing fibers, and/or two or more two-dimensional arrangements of reinforcing fibers that are stacked on top of one another.

Figure 7:
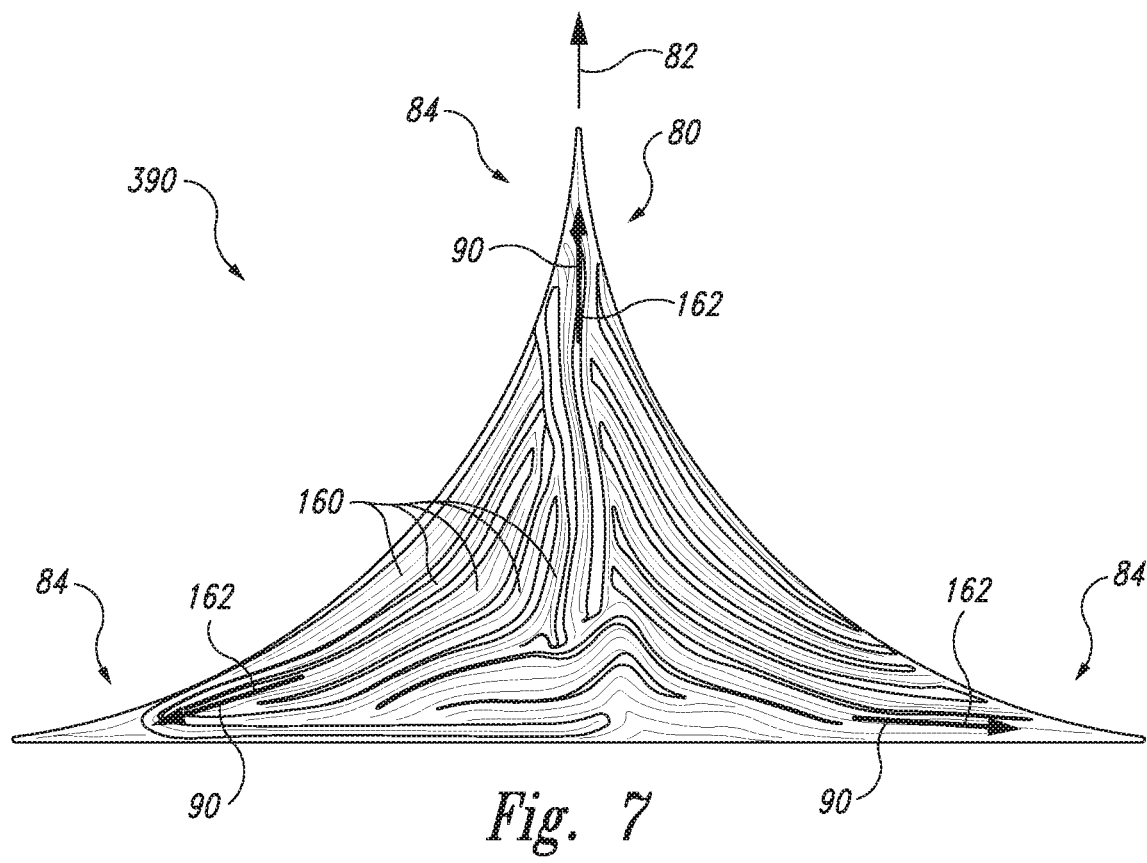
FIG. 7 is a cross-sectional view of a radius filler according to the present disclosure.

FIG. 7 is a cross-sectional view of a radius filler 390 according to the present disclosure. As discussed, radius filler 390 includes a plurality of lengths of composite tape 160. As also discussed, at least a portion of the plurality of lengths of composite tape 160 is oriented at a skew angle with respect to a remainder of the plurality of lengths of composite tape 160 within radius filler 390.

FIG. 7 illustrates a specific relative orientation for lengths of composite tape 160 within radius filler 390; however other relative orientations are also within the scope of the present disclosure, such as those relative orientations that may be selected based, at least in part, on a specific material property field of a given transition region 40, as discussed herein. FIG. 7 also illustrates that, as discussed, transition region 40 may define a principle stress region 80 that may include and/or define a principle stress direction 82, and at least a portion of the plurality of lengths of composite tape 160 may be oriented such that a fiber axis direction 162 of reinforcing fibers 90 thereof extends at least substantially parallel to the principle stress direction. Additionally or alternatively, and as also discussed, radius filler 390 may define one or more apex regions 84, and at least a portion of the plurality of lengths of composite tape may be oriented such that reinforcing fibers 90 thereof define a fiber axis direction 162 that is directed into and/or that extends within apex region 84.

Figure 9:
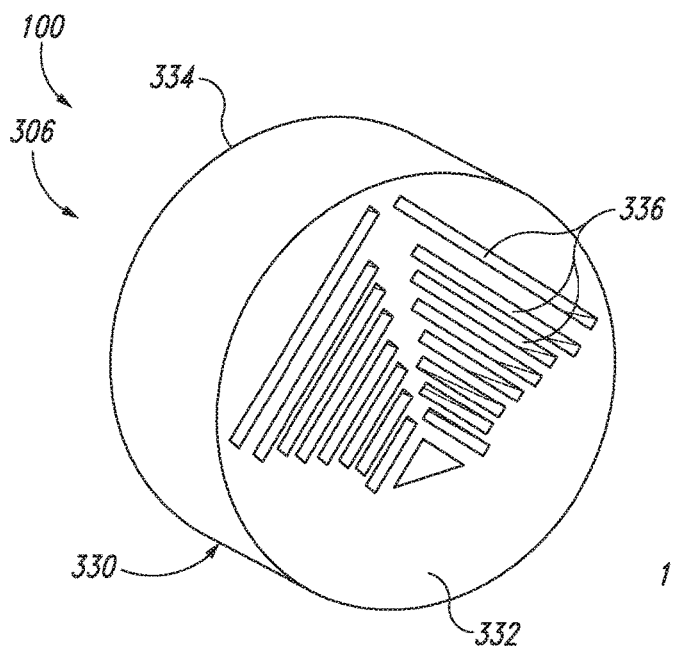
FIG. 9 is a schematic representation of a forming die according to the present disclosure.
Figure 10:
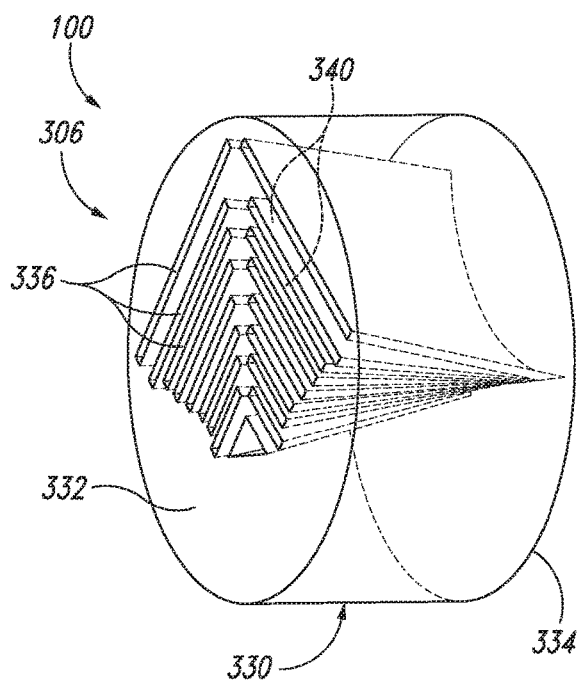
FIG. 10 is another schematic representation of the forming die of FIG. 10.
Figure 11:
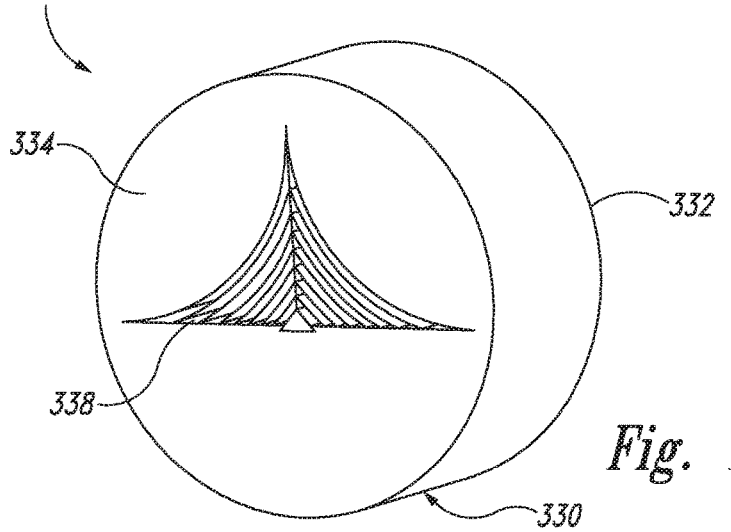
FIG. 11 is another schematic representation of the forming die of FIG. 10.

FIG. 8 is a schematic representation of a system 100 for forming a radius filler 390 according to the present disclosure. FIG. 8 illustrates fiber axis directions 162 for lengths of composite tape 160 that may be combined in a forming die 306 to produce radius filler 390 according to the present disclosure and/or skew angles 96 for lengths of composite tape 160 within radius fillers 390 according to the present disclosure. In FIG. 8, a plurality of lengths of composite tape 160 may be provided to forming die 306 according to the present disclosure. Forming die 306 also may be referred to herein as a radius filler die 306 and may be configured to receive the plurality of lengths of composite tape 160 and to converge the plurality of lengths of composite tape 160 therein to produce and/or generate radius filler 390. Illustrative, non-exclusive examples of forming die 306 are illustrated in FIGS. 9-11 and discussed herein. Additional illustrative, non-exclusive examples of forming die 306 and/or of systems 100 that include forming die 306 and/or that may be utilized to form radius filler 390 are disclosed in U.S. Patent Application Publication No. 2014/0034236, the complete disclosure of which is hereby incorporated by reference.

As discussed, each length of composite tape 160 may include a plurality of reinforcing fibers 90 and a resin material 92. As also discussed, the plurality of reinforcing fibers 90 of a given length of composite tape 160 may be oriented at any suitable fiber angle 164 relative to a longitudinal axis 392 thereof. Longitudinal axis 392 also may be referred to herein as a radius filler longitudinal axis 392 once lengths of composite tape 160 are combined to form radius filler 390. This is further illustrated in FIG. 8 at 164, wherein schematic cross-sectional views of various lengths of composite tape 160 that include reinforcing fibers 90 are illustrated. As illustrated at 166, fiber angle 164 may be zero degrees (i.e., fiber axis direction 162 may be parallel to longitudinal axis 392). Under these conditions, fibers 90 may appear somewhat circular in cross-section and/or may define a relatively small cross-sectional area.

Additionally or alternatively, and as illustrated at 168, fiber angle 164 may be a finite angle that is between 0 degrees and 90 degrees, such as 45 degrees (i.e., fiber axis direction 162 and longitudinal axis 392 may define a fiber angle 164 of 45 degrees therebetween). Under these conditions, fibers 90 may appear more oblong in cross-section and/or may define a relatively larger cross-sectional area.

Additionally or alternatively, and as illustrated at 170, fiber angle 164 may be approximately 90 degrees (i.e., fiber axis direction 162 and longitudinal axis 392 may define a fiber angle 164 of 90 degrees therebetween). Under these conditions, fibers 90 may appear linear in cross-section.

FIGS. 9-11 are schematic representations of a forming die 306 according to the present disclosure. Forming die 306 includes a die body 330 that defines a first side 332 and a second side 334. As illustrated in FIGS. 9-10, first side 332 defines a plurality of first openings 336 that are configured to receive the plurality of lengths of composite tape 160 (as illustrated in FIG. 8). As illustrated in FIG. 10, the plurality of first openings direct the plurality of lengths of composite tape 160 into a plurality of channels 340 that are defined within die body 330. The plurality of channels 340 may converge upon one another within die body 330 and may cause the plurality of lengths of composite tape 160 to contact and/or press against one another within die body 330 prior to exiting forming die 306 through a second opening 338 that is defined within second side 334, as illustrated in FIG. 11.

Figure 12:
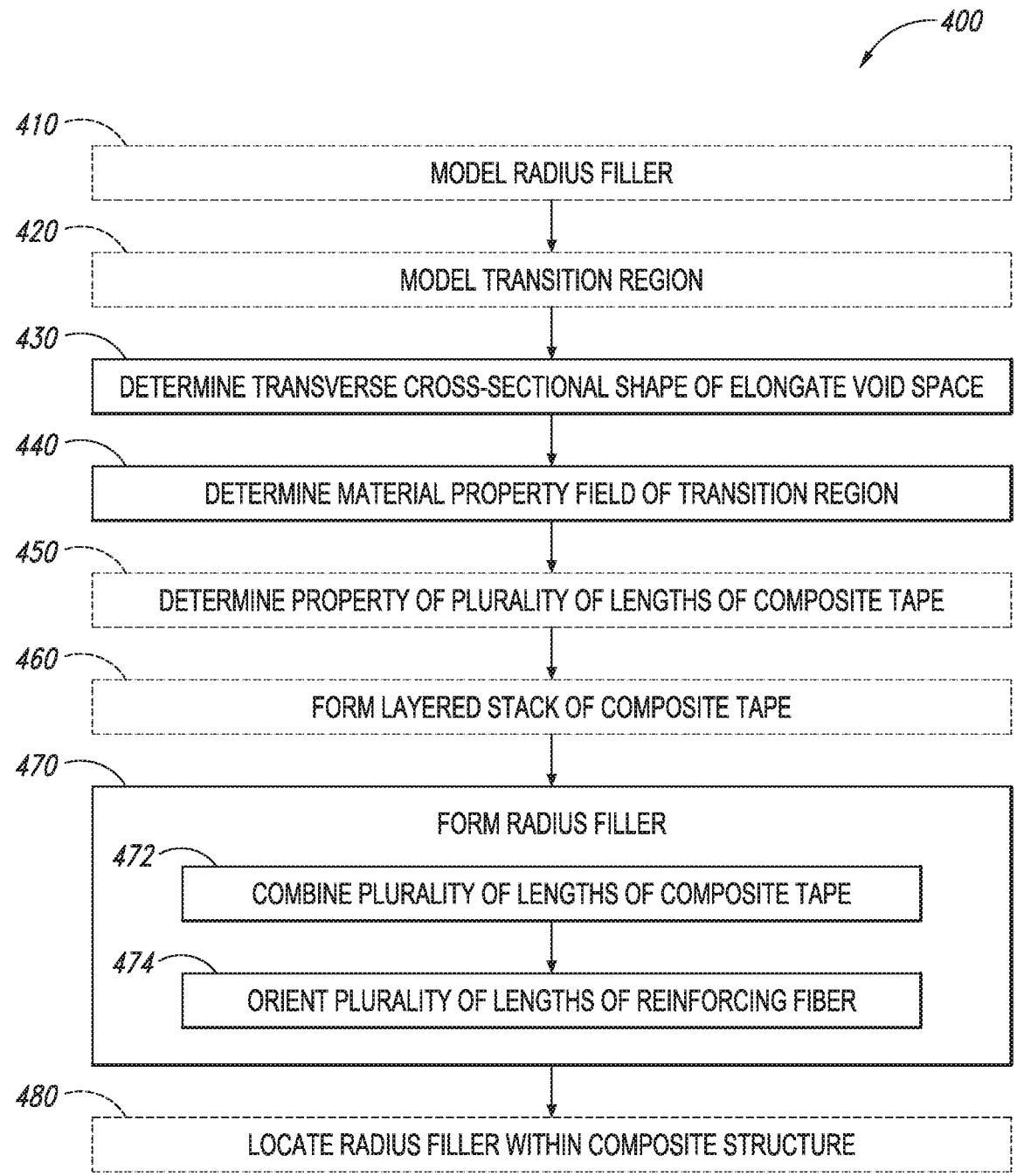
FIG. 12 is a flowchart depicting methods of forming a radius filler according to the present disclosure.

FIG. 12 is a flowchart depicting methods 400 of forming a radius filler for a composite structure according to the present disclosure. The composite structure may include a plurality of plies of composite material that converge within a transition region to define an elongate void space. The radius filler may be configured to extend within the elongate void space and/or to support a portion of the plurality of plies of composite material that defines the elongate void space. Methods 400 may include modeling the radius filler at 410 and/or modeling the transition region at 420. Methods 400 include determining a transverse cross-sectional shape of the elongate void space at 430 and determining a material property field of the transition region at 440. Methods 400 further may include determining a property of a plurality of lengths of composite tape that defines the radius filler at 450 and/or forming a layered stack of composite tape at 460. Methods 400 further include forming the radius filler at 470 and may include locating the radius filler within the composite structure at 480.

Modeling the radius filler at 410 may include modeling, establishing, and/or determining any suitable property of the radius filler. As an illustrative, non-exclusive example, the modeling at 410 may include modeling a material property field of the radius filler. Illustrative, non-exclusive examples of the material property field of the radius filler include a stiffness field of the radius filler, a coefficient of thermal expansion field of the radius filler, a stress field of the radius filler, and/or a resin shrinkage field of the radius filler. It is within the scope of the present disclosure that the modeling at 410 may include modeling in any suitable manner. As illustrative, non-exclusive examples, the modeling at 410 may include mathematical modeling of the radius filler and/or finite element analysis of the radius filler.

Modeling the transition region at 420 may include modeling, establishing, and/or determining any suitable property of the transition region. As an illustrative, non-exclusive example, the modeling at 420 may include modeling the material property field of the transition region, such as to permit and/or facilitate the determining at 440.

It is within the scope of the present disclosure that the modeling at 420 may include modeling any suitable portion of the composite structure under any suitable conditions. As illustrative, non-exclusive examples, the modeling at 420 may include modeling the transition region, modeling curing of the transition region, modeling the transition region during operation of the composite structure, modeling the composite structure, modeling curing of the composite structure, and/or modeling the composite structure during operation of the composite structure.

Determining the transverse cross-sectional shape of the elongate void space at 430 may include determining the transverse cross-sectional shape of the elongate void space in any suitable manner. As illustrative, non-exclusive examples, the determining at 430 may include modeling the composite structure, the transition region, and/or the elongate void space. As another illustrative, non-exclusive example, the determining at 430 may include measuring the elongate void space. As yet another illustrative, non-exclusive example, the determining at 430 may include establishing and/or determining a desired transverse cross-sectional shape of the elongate void space.

Determining the material property field of the transition region at 440 may include determining any suitable material property field of the transition region in any suitable manner. As an illustrative, non-exclusive example, the determining at 440 may include modeling the composite structure, the transition region, and/or the elongate void space, such as via the modeling at 420. As another illustrative, non-exclusive example, the determining at 440 may include measuring the material property field of the transition region. As yet another illustrative, non-exclusive example, the determining at 440 may include establishing and/or determining a desired material property field of the transition region.

It is within the scope of the present disclosure that the determining at 440 may include determining any suitable material property field of the transition region in any suitable dimension, combination of dimensions, direction, and/or combination of directions. Illustrative, non-exclusive examples of the material property field of the transition region include a stiffness field of the transition region, a coefficient of thermal expansion field of the transition region, a stress field of the transition region, and/or a resin shrinkage field of the transition region.

The determining at 440 may include determining a one-dimensional material property field of the transition region, determining a two-dimensional material property field of the transition region, and/or determining a three-dimensional material property field of the transition region. As a more specific but still illustrative, non-exclusive example, the determining at 440 may include determining a first field value of the material property field of the transition region in a first direction that extends along the elongate void space, determining a second field value of the material property field of the transition region in a second direction that is perpendicular to the first direction, and/or determining a third field value of the material property field of the transition region in a third direction that is perpendicular to the first direction and to the second direction. As another more specific but still illustrative, non-exclusive example, the determining at 440 also may include establishing an array and/or grid of values of the material property field at various locations within the transition region.

Additionally or alternatively, the determining at 440 also may include determining a principle stress region within the transition region and/or determining a principle stress direction within the principle stress region. The principle stress region may include and/or be a portion of the transition region that has the greatest stress and/or that has greater than a threshold stress value. The principle stress direction may be a direction, or average direction, over which the stress is applied within the principle stress region.

Determining the property of the plurality of lengths of composite tape at 450 may include determining and/or establishing any suitable property of any suitable portion of the plurality of lengths of composite tape. The determining at 450 may be based upon any suitable criteria and may be performed with any suitable sequence within methods 400, such as prior to the forming at 470.

As an illustrative, non-exclusive example, the determining at 450 may include determining and/or establishing a width of each of the plurality of lengths of composite tape based, at least in part, on the transverse cross-sectional shape of the elongate void space and/or on the material property field of the transition region. As another illustrative, non-exclusive example, the determining at 450 may include determining and/or establishing a thickness of each of the plurality of lengths of composite tape based, at least in part, on the transverse cross-sectional shape of the elongate void space and/or on the material property field of the transition region.

As yet another illustrative, non-exclusive example, the determining at 450 also may include determining and/or establishing the fiber axis direction within each of the plurality of lengths of composite tape based, at least in part, on the transverse cross-sectional shape of the elongate void space and/or on the material property field of the transition region. As another illustrative, non-exclusive example, the determining at 450 may include determining and/or establishing a relative location of each of the plurality of lengths of composite tape within the radius filler based, at least in part, on the transverse cross-sectional shape of the elongate void space and/or on the material property field of the transition region.

Forming the layered stack of composite tape at 460 may include forming any suitable layered stack that includes two or more lengths of composite tape and may be performed prior to the forming at 470. As an illustrative, non-exclusive example, the layered stack of composite tape may include a first length of composite tape that defines a first fiber axis direction and a second length of composite tape that defines a second fiber axis direction that is different from the first fiber axis direction. As a more specific but still illustrative, non-exclusive example, the first fiber axis direction may be at least substantially parallel to a longitudinal axis of the length of composite tape (i.e., the first fiber axis direction may be oriented at a fiber angle of zero degrees, as illustrated in FIG. 4), while the second fiber axis direction may be at least substantially perpendicular to the longitudinal axis of the length of composite tape (i.e., the second fiber axis direction may be oriented at a fiber angle of 90 degrees, as illustrated in FIG. 6). This may permit the forming at 470 to be performed utilizing a pulltrusion process without shearing the second length of composite tape.

Forming the radius filler at 470 may include forming the radius filler in any suitable manner. As an illustrative, non-exclusive example, the forming at 470 may include combining, at 472, the plurality of lengths of composite tape to define a radius filler cross-sectional shape that corresponds to the transverse cross-sectional shape of the elongate void space. As another illustrative, non-exclusive example, the forming at 470 also may include orienting, at 474, the plurality of lengths of reinforcing fiber in each of the plurality of lengths of composite tape based, at least in part, on the material property field of the transition region. Each of the plurality of lengths of composite tape may include a respective plurality of lengths of reinforcing fiber and a resin material, and the plurality of lengths of reinforcing fiber in each of the plurality of lengths of composite tape defines a respective fiber axis direction.

The combining at 472 may include combining in any suitable manner and may include combining such that an outer surface of the radius filler is defined by lengths of composite tape that have, or define, a fiber axis direction that is parallel to a longitudinal axis of the radius filler. As an illustrative, non-exclusive example, the combining at 472 may include combining with a pulltrusion process. As another illustrative, non-exclusive example, the combining at 472 also may include combining with a press forming process.

As a more specific but still illustrative, non-exclusive example, the combining at 472 may include receiving the plurality of lengths of composite tape into a plurality of first openings on a first side of a forming die, pressing the plurality of lengths of composite tape against one another within the forming die to form the radius filler, and withdrawing the radius filler from (a single) second opening on a second side of the forming die. Under these conditions, the combining at 472 may be an at least substantially continuous process in which the receiving, the pressing, and the withdrawing are performed concurrently and/or simultaneously. The forming die may define a plurality of channels that extend between the plurality of first openings and the second opening, and the orienting at 474 may include selecting a relative orientation among the plurality of channels, such as by selecting the forming die and/or by selecting a configuration of the plurality of channels within the forming die.

The orienting at 474 may include orienting such that the material property field of the radius filler corresponds to and/or is based upon the material property field of the transition region. This may include orienting such that the material property field of the radius filler matches the material property field of the transition region to within a threshold material property field difference at an interface between the transition region and the radius filler. Illustrative, non-exclusive examples of the threshold material property field difference are disclosed herein.

When the determining at 440 includes determining the principle stress region and/or the principle stress direction, the orienting at 474 further may include orienting such that at least one of the plurality of lengths of composite tape defines a respective fiber axis direction that extends within a portion of the radius filler that is located within the principle stress region and/or that is aligned at least substantially parallel to the principle stress direction. When methods 400 include the modeling at 410 and/or the modeling at 420, the orienting at 474 may include orienting based, at least in part, on the modeling at 410 and/or on the modeling at 420.

Locating the radius filler within the composite structure at 480 may include locating and/or placing the radius filler within the composite structure. This may include locating and/or placing such that the radius filler extends within the elongate void space and/or contacts the plurality of plies of composite material that defines the elongate void space. It is within the scope of the present disclosure that, subsequent to the locating at 480, methods 400 further may include heating and/or curing the composite structure.

Illustrative, non-exclusive examples of inventive subject matter according to the present disclosure are described in the following enumerated paragraphs:

A1. A method of forming a radius filler for a composite structure, wherein the composite structure includes a plurality of plies of composite material that converge within a transition region to define an elongate void space, and further wherein the radius filler is configured to extend within the elongate void space, the method comprising:

determining a transverse cross-sectional shape of the elongate void space;

determining a material property field of the transition region; and forming the radius filler, wherein the forming includes:

combining a plurality of lengths of composite tape to define a radius filler transverse cross-sectional shape that corresponds to the transverse cross-sectional shape of the elongate void space, wherein each of the plurality of lengths of composite tape includes a respective plurality of lengths of reinforcing fiber and a resin material, and further wherein each of the plurality of lengths of composite tape defines a fiber axis direction; and orienting the plurality of lengths of reinforcing fiber of each of the plurality of lengths of composite tape based, at least in part, on the material property field of the transition region.

A2. The method of paragraph A1, wherein the determining the transverse cross-sectional shape of the elongate void space includes at least one of modeling the composite structure and determining a desired transverse cross-sectional shape for the elongate void space.

A3. The method of any of paragraphs A1-A2, wherein the determining the material property field of the transition region includes at least one of modeling the transition region, modeling curing of the transition region, modeling the transition region during operation of the composite structure, modeling the composite structure, modeling curing of the composite structure, and modeling the composite structure during operation of the composite structure.

A4. The method of any of paragraphs A1-A3, wherein the orienting includes orienting such that a material property field of the radius filler at least one of:

(i) corresponds to the material property field of the transition region; and (ii) matches the material property field of the transition region to within a threshold material property field difference at an interface between the transition region and the radius filler.

A5. The method of paragraph A4, wherein the threshold material property field difference is less than 50%, less than 40%, less than 30%, less than 20%, less than 15%, less than 10%, less than 5%, less than 2.5%, or less than 1% of the material property field of the transition region.

A6. The method of any of paragraphs A1-A5, wherein the determining the material property field of the transition region includes at least one of determining a two-dimensional material property field of the transition region and determining a three-dimensional material property field of the transition region.

A7. The method of any of paragraphs A1-A6, wherein the material property field of the transition region has a first field value in a first direction that extends along the elongate void space, a second field value in a second direction that is perpendicular to the first direction, and a third value in a third direction that is perpendicular to the first direction and to the second direction.

A8. The method of paragraph A7, wherein the determining the material property field of the transition region includes determining at least two, and optionally all, of the first field value, the second field value, and the third field value.

A9. The method of any of paragraphs A7-A8, wherein the determining the material property field of the transition region includes determining the second field value and the third field value.

A10. The method of any of paragraphs A1-A9, wherein the material property field of the transition region includes a stiffness field of the transition region, and optionally wherein a/the material property field of the radius filler includes a stiffness field of the radius filler.

A11. The method of any of paragraphs A1-A10, wherein the material property field of the transition region includes a coefficient of thermal expansion field of the transition region, and optionally wherein a/the material property field of the radius filler includes a coefficient of thermal expansion field of the radius filler.

A12. The method of any of paragraphs A1-A11, wherein the material property field of the transition region includes a stress field of the transition region, and optionally wherein a/the material property field of the radius filler includes a stress field of the radius filler.

A13. The method of any of paragraphs A1-A12, wherein the determining the material property field of the transition region includes determining a principle stress region within the transition region and determining a principle stress direction within the principle stress region, and further wherein the orienting includes orienting such that at least one of the plurality of lengths of composite tape defines a respective fiber axis direction that extends within a portion of the radius filler that is located within the principle stress region and at least substantially parallel to the principle stress direction.

A14. The method of any of paragraphs A1-A13, wherein the material property field of the transition region includes a resin shrinkage field of the transition region that corresponds to shrinkage of resin material within the plurality of plies of composite material during curing of the composite structure, and optionally wherein a/the material property field of the radius filler includes a resin shrinkage field of the radius filler that corresponds to shrinkage of resin material within the radius filler during curing of the composite structure.

A15. The method of any of paragraphs A1-A14, wherein the method further includes modeling the radius filler, and further wherein the orienting includes orienting based upon the modeling.

A16. The method of any of paragraphs A1-A15, wherein, prior to the combining, the method further includes determining a width of each of the plurality of lengths of composite tape based, at least in part, on at least one of the transverse cross-sectional shape of the elongate void space and the material property field of the transition region.

A17. The method of any of paragraphs A1-A16, wherein, prior to the combining, the method further includes determining a thickness of each of the plurality of lengths of composite tape based, at least in part, on at least one of the transverse cross-sectional shape of the elongate void space and the material property field of the transition region.

A18. The method of any of paragraphs A1-A17, where, prior to the combining, the method further includes determining the fiber axis direction within each of the plurality of lengths of composite tape based, at least in part, on at least one of the transverse cross-sectional shape of the elongate void space and the material property field of the transition region.

A19. The method of any of paragraphs A1-A18, where, prior to the combining, the method further includes establishing a relative location of each of the plurality of lengths of composite tape within the radius filler based, at least in part, on at least one of the transverse cross-sectional shape of the elongate void space and the material property field of the transition region.

A20. The method of any of paragraphs A1-A19, wherein, prior to the combining, the method further includes forming a layered stack of composite tape that includes at least a first length of composite tape and a second length of composite tape, wherein a first fiber axis direction of the first length of composite tape is different from a second fiber axis direction of the second length of composite tape.

A21. The method of any of paragraphs A1-A20, wherein the combining includes combining such that each of the plurality of lengths of composite tape that defines an outer surface of the radius filler defines a fiber axis direction that is parallel to a longitudinal axis of the radius filler.

A22. The method of any of paragraphs A1-A21, wherein the combining includes combining with a pulltrusion process.

A23. The method of any of paragraphs A1-A22, wherein the combining includes combining with a press forming process.

A24. The method of any of paragraphs A1-A23, wherein the combining includes:

(i) receiving the plurality of lengths of composite tape into a plurality of first openings on a first side of a forming die;

(ii) pressing the plurality of lengths of composite tape against one another within the forming die to form the radius filler; and (iii) withdrawing the radius filler from a second opening on a second side of the forming die, wherein the receiving, the pressing, and the withdrawing are performed concurrently.

A25. The method of paragraph A24, wherein the forming die defines a plurality of channels that extend between the plurality of first openings and the second opening, and further wherein the orienting includes selecting a relative orientation among the plurality of channels.

A26. The method of any of paragraphs A1-A25, wherein the method further includes locating the radius filler within the composite structure.

B1. A radius filler for a composite structure, wherein the composite structure includes a plurality of plies of composite material that converge within a transition region to define an elongate void space, wherein the plurality of plies of composite material defines a material property field of the transition region, and further wherein the radius filler is configured to extend within the elongate void space, the radius filler comprising:

a plurality of lengths of composite tape;

wherein each of the plurality of lengths or composite tape includes a respective plurality of lengths of reinforcing fiber and a resin material;

wherein the plurality of lengths of reinforcing fiber in each of the plurality of lengths of composite tape defines a fiber axis direction; and further wherein each of the plurality of lengths of composite tape defines a respective fiber axis direction that is selected based, at least in part, on the material property field of the transition region.

B2. The radius filler of paragraph B1, wherein the material property field of the transition region is at least one of a two-dimensional material property field of the transition region and a three-dimensional material property field of the transition region.

B3. The radius filler of any of paragraphs B1-B2, wherein a material property field of the radius filler at least one of:

(i) corresponds to the material property field of the transition region; and (ii) matches the material property field of the transition region to within a threshold material property field difference at an interface between the transition region and the radius filler.

B4. The radius filler of paragraph B6, wherein the threshold material property field difference is less than 50%, less than 40%, less than 30%, less than 20%, less than 15%, less than 10%, less than 5%, less than 2.5%, or less than 1% of the material property field of the transition region.

B5. The radius filler of any of paragraphs B3-B4, wherein the material property field of the radius filler is at least one of a two-dimensional material property field of the radius filler and a three-dimensional material property field of the radius filler.

B6. The radius filler of any of paragraphs B3-B5, wherein the material property field of the transition region has a first field value in a first direction that extends along the elongate void space, a second field value in a second direction that is perpendicular to the first direction, and a third value in a third direction that is perpendicular to the first direction and to the second direction.

B7. The radius filler of paragraph B6, wherein the material property field of the radius filler corresponds to the material property field of the transition region in at least two, and optionally all, of the first direction, the second direction, and the third direction.

B8. The radius filler of any of paragraphs B6-B7, wherein the material property field of the radius filler corresponds to the material property field of the transition region in the second direction and in the third direction.

B9. The radius filler of any of paragraphs B1-B8, wherein the material property field of the transition region includes a stiffness field of the transition region, and optionally wherein a/the material property field of the radius filler includes a stiffness field of the radius filler.

B10. The radius filler of any of paragraphs B1-B9, wherein the material property field of the transition region includes a coefficient of thermal expansion field of the transition region, and optionally wherein a/the material property field of the radius filler includes a coefficient of thermal expansion field of the radius filler.

B11. The radius filler of any of paragraphs B1-B10, wherein the material property field of the transition region includes a stress field of the transition region, and optionally wherein a/the material property field of the radius filler includes a stress field of the radius filler.

B12. The radius filler of paragraph B11, wherein the stress field of the transition region defines a principle stress region within the transition region and a principle stress direction within the principle stress region.

B13. The radius filler of paragraph B12, wherein at least one of the plurality of lengths of composite tape defines a respective fiber axis direction that extends within a portion of the radius filler that is located within the principle stress region and at least substantially parallel to the principle stress direction.

B14. The radius filler of any of paragraphs B12-B13, wherein the principle stress direction is measured perpendicular to a/the longitudinal axis of the elongate void space.

B15. The radius filler of any of paragraphs B12-B14, wherein a, or any, plane that passes through the radius filler and is perpendicular to the principle stress direction intersects the plurality of lengths of reinforcing fiber of at least one of the plurality of lengths of composite tape.

B16. The radius filler of any of paragraphs B1-B15, wherein the radius filler defines an apex region within a plane that is perpendicular to a longitudinal axis of the radius filler, and further wherein at least one of the plurality of lengths of composite tape defines a respective fiber axis direction that is directed into the apex region.

B17. The radius filler of any of paragraphs B1-B16, wherein the material property field of the transition region includes a resin shrinkage field of the transition region that describes shrinkage of resin material within the plurality of plies of composite material during curing of the composite structure, and optionally wherein a/the material property field of the radius filler includes a resin shrinkage field of the radius filler that describes shrinkage of resin material within the radius filler during curing of the composite structure.

B18. The radius filler of any of paragraphs B1-B17, wherein the plurality of lengths of composite tape is in physical contact with one another within the radius filler.

B19. The radius filler of any of paragraphs B1-B18, wherein the radius filler at least substantially, and optionally completely, fills the elongate void space.

B20. The radius filler of any of paragraphs B1-B19, wherein the plurality of plies of composite material includes a first ply of composite material, a second ply of composite material, and a third ply of composite material, wherein the first ply of composite material and the second ply of composite material define a first contact region therebetween, wherein the second ply of composite material and the third ply of composite material define a second contact region therebetween, wherein the third ply of composite material and the first ply of composite material define a third contact region therebetween, and further wherein the first contact region, the second contact region and the third contact region terminate within the elongate void space.

B21. The radius filler of any of paragraphs B1-B20, wherein the plurality of lengths of composite tape is not coplanar with one another.

B22. The radius filler of any of paragraphs B1-B21, wherein at least one length of composite tape of the plurality of lengths of composite tape is in direct physical contact with and not coplanar with another of the plurality of lengths of composite tape.

B23. The radius filler of any of paragraphs B1-B22, wherein the radius filler does not include a separate resin material that separates the plurality of lengths of composite tape from one another.

B24. The radius filler of any of paragraphs B1-B23, wherein the radius filler does not include a thermoplastic resin material that separates the plurality of lengths of composite tape from one another.

B25. The radius filler of any of paragraphs B1-B24, wherein at least a selected length of composite tape of the plurality of lengths of composite tape is arranged at a skew angle with respect to at least a portion of a remainder of the plurality of lengths of composite tape.

B26. The radius filler of paragraph B25, wherein the selected length of composite tape is a first length of composite tape, wherein the skew angle is a first skew angle, and further wherein the radius filler includes a second length of composite tape that is arranged at a second skew angle with respect to the first length of composite tape and the portion of the remainder of the plurality of lengths of composite tape.

B27. The radius filler of any of paragraphs B25-B26, wherein the skew angle is at least 5 degrees, at least 10 degrees, at least 15 degrees, at least 20 degrees, at least 25 degrees, at least 30 degrees, at least 35 degrees, at least 40 degrees, or at least 45 degrees.

B28. The radius filler of any of paragraphs B25-B27, wherein the skew angle is less than 90 degrees, less than 85 degrees, less than 80 degrees, less than 75 degrees, less than 70 degrees, less than 65 degrees, less than 60 degrees, less than 55 degrees, less than 50 degrees, or less than 40 degrees.

B29. The radius filler of any of paragraphs B25-B28, wherein the skew angle is measured in a transverse cross-section of the radius filler.

B30. The radius filler of any of paragraphs B1-B29, wherein the radius filler defines at least one of a triangular transverse cross-sectional shape, a wedge-shaped transverse cross-sectional shape, and a transverse cross-section that defines a base and a plurality of convergingly angled sides.

B31. The radius filler of any of paragraphs B1-B30, wherein the plurality of lengths of composite tape includes at least 2, at least 4, at least 6, at least 8, at least 10, at least 15, at least 20, at least 30, at least 40, at least 50, at least 60, or at least 80 lengths of composite tape.

B32. The radius filler of paragraph B31, wherein a number of lengths of composite tape that are included in the radius filler varies along a length of the radius filler.

B33. The radius filler of any of paragraphs B1-B32, wherein each of the plurality of lengths of composite tape defines a length and a width.

B34. The radius filler of paragraph B33, wherein the length of a portion of the plurality of lengths of composite tape is at least one of:
(i) at least 1 meter (m), at least 2 m, at least 3 m, at least 4 m, at least 5 m, at least 6 m, at least 7 m, at least 8 m, at least 9 m, at least 10 m, at least 15 m, or at least 20 m; and
(ii) less than 50 m, less than 40 m, less than 30 m, less than 25 m, less than 20 m, less than 15 m, less than 10 m, or less than 5 m.

B35. The radius filler of any of paragraphs B33-B34, wherein the width of a portion of the plurality of lengths of composite tape is at least one of:
(i) at least 3 millimeters (mm), at least 4 mm, at least 5 mm, at least 6 mm, at least 7 mm, at least 8 mm, at least 9 mm, at least 10 mm, at least 11 mm, at least 12 mm, at least 14 mm, at least 16 mm, at least 18 mm, at least 20 mm, or at least 24 mm; and
(ii) less than 50 mm, less than 45 mm, less than 40 mm, less than 35 mm, less than 30 mm, less than 25 mm, less than 20 mm, less than 18 mm, less than 16 mm, less than 14 mm, less than 12 mm, less than 10 mm, less than 8 mm, less than 6 mm, or less than 4 mm.

B36. The radius filler of any of paragraphs B34-B35, wherein the portion of the plurality of lengths of composite tape includes at least one length of composite tape, two lengths of composite tape, three lengths of composite tape, at least 25% of the plurality of lengths of composite tape, at least 50% of the plurality of composite tape, at least 75% of the plurality of lengths of composite tape, or 100% of the plurality of lengths of composite tape.

B37. The radius filler of any of paragraphs B1-B36, wherein the plurality of lengths of reinforcing fiber is formed from at least one of carbon, titanium, aluminum, a glass, and a metal.

B38. The radius filler of any of paragraphs B1-B37, wherein a fiber longitudinal axis of each of the plurality of reinforcing fibers is substantially parallel to a fiber axis direction, wherein the radius filler defines a radius filler longitudinal axis, and further wherein the fiber axis direction is one of parallel to and oriented at a fiber angle with respect to the radius filler longitudinal axis.

B39. The radius filler of paragraph B38, wherein the fiber angle includes a fiber angle of at least one of:
(i) at least 5 degrees, at least 10 degrees, at least 15 degrees, at least 20 degrees, at least 25 degrees, at least 30 degrees, at least 35 degrees, at least 40 degrees, or at least 45 degrees; and
(ii) less than 85 degrees, less than 80 degrees, less than 75 degrees, less than 70 degrees, less than 65 degrees, less than 60 degrees, less than 55 degrees, less than 50 degrees, or less than 40 degrees.

B40. The radius filler of any of paragraphs B1-B39, wherein the plurality of reinforcing fibers forms a two-dimensional arrangement within at least a portion of the plurality of lengths of composite tape, and optionally wherein the two-dimensional arrangement includes at least one of a mesh, a woven structure, a cloth, and a random array of reinforcing fibers.

B41. The radius filler of any of paragraphs B1-B40, wherein the plurality of reinforcing fibers form a three-dimensional arrangement within at least a portion of the plurality of lengths of composite tape, and optionally wherein the three-dimensional arrangement includes at least one of a mesh, a woven structure, a cloth, a random array of reinforcing fibers, and two or more two-dimensional arrangements of reinforcing fibers that are stacked on top of one another.

C1. A composite structure, comprising:
a plurality of plies of composite material that converge within a transition region to define an elongate void space; and
the radius filler of any of paragraphs B1-B41, wherein the radius filler extends within the void space.

C2. The composite structure of paragraph C1, wherein the radius filler is operatively affixed to the plurality of plies of composite material.

C3. The composite structure of any of paragraphs C1-C2, wherein the composite structure includes at least one of an aircraft, a portion of the aircraft, a fuselage barrel of the aircraft, a portion of the fuselage barrel of the aircraft, a wing of the aircraft, a portion of the wing of the aircraft, a stabilizer of the aircraft, and a portion of the stabilizer of the aircraft.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A radius filler for a composite structure, wherein the composite structure includes a plurality of plies of composite material that converge within a transition region to define an elongate void space, wherein the plurality of plies of composite material defines a material property gradient of the transition region, wherein the material property gradient of the transition region includes a mathematical description of a variation in at least one material property with direction within the transition region, and further wherein the radius filler is configured to extend within the elongate void space, the radius filler comprising:
   a plurality of lengths of composite tape;
   wherein the plurality of lengths of composite tape includes a first set of plies that defines a first edge and a second set of plies that defines a second edge, and further wherein the first edge and the second edge are in contact with one another.

2. The composite structure of claim 1, wherein:
   (i) each of the plurality of lengths of composite tape includes a respective plurality of lengths of reinforcing fibers and a resin material;
   (ii) the plurality of lengths of reinforcing fibers in each of the plurality of lengths of composite tape defines a fiber axis direction; and
   (iii) each of the plurality of lengths of composite tape defines a respective fiber axis direction that is selected based, at least in part, on the material property gradient of the transition region.

3. The radius filler of claim 2, wherein the radius filler defines an apex region within a plane that is perpendicular to a longitudinal axis of the radius filler and further wherein at least one of the plurality of lengths of composite tape defines a respective fiber axis direction that is directed into the apex region.

4. The radius filler of claim 1, wherein the plurality of lengths of composite tape is in physical contact with one another within the radius filler.

5. A composite structure, comprising:
   a plurality of plies of composite material that converges within a transition region to define an elongate void space; and
   the radius filler of claim 1, wherein the radius filler extends within the elongate void space.

6. The composite structure of claim 5, wherein the radius filler is operatively affixed to the plurality of plies of composite material.

7. The composite structure of claim 5, wherein the composite structure includes at least one of an aircraft, a portion of the aircraft, a fuselage barrel of the aircraft, a portion of the fuselage barrel of the aircraft, a wing of the aircraft, a portion of the wing of the aircraft, a stabilizer of the aircraft, and a portion of the stabilizer of the aircraft.

8. The composite structure of claim 5, wherein a material property gradient of the radius filler corresponds to the material property gradient of the transition region.

9. The composite structure of claim 5, wherein a material property gradient of the radius filler matches the material property gradient of the transition region to within 20% of the material property gradient of the transition region at an interface between the transition region and the radius filler.

10. The composite structure of claim 5, wherein the material property gradient of the transition region is at least one of:
   (i) a two-dimensional material property gradient of the transition region; and
   (ii) a three-dimensional material property gradient of the transition region.

11. The composite structure of claim 5, wherein the material property gradient of the transition region has a first gradient value in a first direction that extends along the elongate void space, a second gradient value in a second direction that is perpendicular to the first direction, and a third gradient value in a third direction that is perpendicular to the first direction and to the second direction, and further wherein a material property gradient of the radius filler corresponds to the material property gradient of the transition region in at least two of the first direction, the second direction, and the third direction.

12. The composite structure of claim 5, wherein the material property gradient of the transition region includes a stiffness gradient of the transition region and a material property gradient of the radius filler includes a stiffness gradient of the radius filler.

13. The composite structure of claim 5, wherein the material property gradient of the transition region includes a coefficient of thermal expansion gradient of the transition region and a material property gradient of the radius filler includes a coefficient of thermal expansion gradient of the radius filler.

14. The composite structure of claim 5, wherein the material property gradient of the transition region includes a stress gradient of the transition region and a material property gradient of the radius filler includes a stress gradient of the radius filler.

15. The composite structure of claim 14, wherein the stress gradient of the transition region defines a principal stress region within the transition region and a principal stress direction within the principal stress region, wherein the principal stress direction is measured perpendicular to a longitudinal axis of the elongate void space.

16. The composite structure of claim 15, wherein each of the plurality of lengths of composite tape includes a respective plurality of lengths of reinforcing fibers, wherein the plurality of lengths of reinforcing fibers in each of the plurality of lengths of composite tape defines a fiber axis direction, and further wherein at least one of the plurality of lengths of composite tape defines a respective fiber axis direction that extends within a portion of the radius filler that is located within the principal stress region and is at least substantially parallel to the principal stress direction.

17. The composite structure of claim 15, wherein any plane that passes through the radius filler and is perpendicular to the principal stress direction intersects the plurality of lengths of reinforcing fibers of at least one of the plurality of lengths of composite tape.

18. The composite structure of claim 5, wherein the radius filler at least substantially fills the elongate void space.

19. The composite structure of claim 5, wherein each of the plurality of lengths of composite tape includes a respective plurality of lengths of reinforcing fibers and a resin material, wherein the material property gradient of the transition region includes a resin shrinkage gradient of the transition region that describes shrinkage of resin material within the plurality of plies of composite material during curing of the composite structure, and further wherein a material property gradient of the radius filler includes a resin shrinkage gradient of the radius filler that describes shrinkage of resin material within the radius filler during curing of the composite structure.

20. The composite structure of claim 5, wherein the plurality of plies of composite material includes a first ply of composite material, a second ply of composite material, and a third ply of composite material, wherein the first ply of composite material and the second ply of composite material define a first contact region therebetween, wherein the second ply of composite material and the third ply of composite material define a second contact region therebetween, wherein the third ply of composite material and the first ply of composite material define a third contact region therebetween, and further wherein the first contact region, the second contact region and the third contact region terminate within the elongate void space.

\* \* \* \* \*